United States Patent
Bai

(10) Patent No.: US 10,252,721 B1
(45) Date of Patent: Apr. 9, 2019

(54) SYSTEM AND METHOD FOR PROVIDING A VEHICLE CONVOY STATUS INDICATION

(71) Applicant: Honda Motor Co., Ltd., Tokyo (JP)

(72) Inventor: Xue Bai, Novi, MI (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/822,965

(22) Filed: Nov. 27, 2017

(51) Int. Cl.
| | |
|---|---|
| *B60W 30/165* | (2012.01) |
| *B60W 30/18* | (2012.01) |
| *G08G 1/00* | (2006.01) |
| *G05D 1/02* | (2006.01) |
| *G08G 1/16* | (2006.01) |

(52) U.S. Cl.
CPC .... *B60W 30/18163* (2013.01); *B60W 30/165* (2013.01); *G05D 1/0293* (2013.01); *G08G 1/162* (2013.01); *G08G 1/22* (2013.01); *B60W 2550/308* (2013.01); *B60W 2550/408* (2013.01)

(58) Field of Classification Search
CPC ......... B60W 30/18163; B60W 30/165; B60W 2550/308; B60W 2550/408; G05D 1/0293; G08G 1/162; G08G 1/22
See application file for complete search history.

(56) References Cited

U.S. PATENT DOCUMENTS

| | | | |
|---|---|---|---|
| 5,923,243 A | 7/1999 | Bleiner | |
| 6,733,134 B2 | 5/2004 | Bleiner | |
| 7,192,172 B1 | 3/2007 | Alberti | |
| 8,762,042 B2 | 6/2014 | Funabashi | |
| 9,013,293 B2 | 4/2015 | Pimentel | |
| 9,475,422 B2 | 10/2016 | Hillis et al. | |
| 9,481,287 B2 | 11/2016 | Marti et al. | |
| 2002/0070849 A1 | 6/2002 | Teicher et al. | |
| 2008/0134955 A1 | 6/2008 | Morrow | |
| 2013/0226433 A1* | 8/2013 | Tominaga | B60W 50/0097 701/96 |
| 2015/0127222 A1* | 5/2015 | Cunningham, III | B60R 1/00 701/41 |
| 2015/0266477 A1* | 9/2015 | Schmudderich | B60W 30/09 701/98 |
| 2016/0019782 A1 | 1/2016 | Alam et al. | |
| 2016/0104381 A1* | 4/2016 | Nath | B60W 30/09 701/23 |
| 2017/0010679 A1 | 1/2017 | Hillis et al. | |
| 2017/0106793 A1* | 4/2017 | Kumar | B60Q 1/085 |
| 2017/0158196 A1* | 6/2017 | Park | G05D 1/0291 |
| 2017/0253177 A1* | 9/2017 | Kawamata | B60Q 1/50 |
| 2018/0297590 A1* | 10/2018 | Kang | B60W 30/09 |

* cited by examiner

*Primary Examiner* — Munear T Akki
(74) *Attorney, Agent, or Firm* — Rankin, Hill & Clark LLP

(57) ABSTRACT

A computer-implemented method and system for controlling vehicles in a vehicle convoy. The vehicles in the vehicle convoy include a following vehicle and a preceding vehicle positioned immediately ahead of the following vehicle. The method includes receiving vehicle convoy data about an environment surrounding the vehicle convoy, and detecting an intention of a remote vehicle to execute a cut-in maneuver into a path of the following vehicle. The method includes controlling a vehicle system of the following vehicle to project a status indication to a ground surface between the following vehicle and the preceding vehicle. Further, the method includes determining whether the cut-in maneuver is acceptable based on the intention of the remote vehicle and a distance between the following vehicle and the preceding vehicle, and controlling the following vehicle based on whether the cut-in maneuver is acceptable.

17 Claims, 4 Drawing Sheets

SYSTEM AND METHOD FOR PROVIDING A VEHICLE CONVOY STATUS INDICATION

BACKGROUND

Adaptive cruise control (ACC) systems can control the speed of a vehicle according to a traffic environment, and in particular, according to a preceding vehicle positioned ahead of the vehicle. More specifically, in the case of vehicle convoys, which include more than one vehicle travelling together in a registered group, ACC systems allow a vehicle in the convoy to follow a leading vehicle within a certain distance measured by time and range (e.g., headway, inter-vehicle distance). The status of the ACC system and the control performed by the ACC system can be affected by the environment surrounding the vehicle convoy, for example, surrounding vehicles and traffic. In some cases, the ACC system can be disabled abruptly if a surrounding vehicle attempts to maneuver within the vehicle convoy (e.g., a cut-in maneuver). Thus, these types of maneuvers can result in unexpected deceleration of vehicles in the convoy and can generally disrupt the traffic flow within the vehicle convoy and traffic flow surrounding the vehicle convoy. Accordingly, communicating the status and control of vehicles in a vehicle convoy can prevent or discourage other vehicles from disrupting the coordinated control.

BRIEF DESCRIPTION

According to one aspect, a computer-implemented method controls vehicles in a vehicle convoy. The vehicles in the vehicle convoy include a following vehicle and a preceding vehicle positioned immediately ahead of the following vehicle. The method includes receiving vehicle convoy data about an environment surrounding the vehicle convoy, and detecting an intention of a remote vehicle to execute a cut-in maneuver into a path of the following vehicle based on the vehicle convoy data. The method includes controlling a vehicle system of the following vehicle to project a status indication to a ground surface between the following vehicle and the preceding vehicle based on the intention of the remote vehicle. The method includes determining whether the cut-in maneuver is acceptable based on the intention of the remote vehicle and a distance between the following vehicle and the preceding vehicle. Further, the method includes controlling the following vehicle based on whether the cut-in maneuver is acceptable.

According to another aspect, a system controls vehicles in a vehicle convoy. The vehicle convoy includes a following vehicle and a preceding vehicle, where the preceding vehicle is position immediately ahead of the following vehicle. The system includes a sensor system to measure vehicle convoy data about an environment surrounding the following vehicle and the preceding vehicle, and a processor operatively connected for computer communication to the sensor system. The processor detects an intention of a remote vehicle in the environment surrounding the following vehicle and the preceding vehicle to execute a cut-in maneuver into a path of the following vehicle based on the vehicle convoy data. The processor controls a vehicle system of the following vehicle to project a status indication to a ground surface between the following vehicle and the preceding vehicle based on the intention of the remote vehicle, and determines whether the cut-in maneuver is acceptable based on the intention of the remote vehicle and a distance between the following vehicle and the preceding vehicle. Further the processor controls vehicles in the vehicle convoy based on whether the cut-in maneuver is acceptable.

According to a further aspect, a non-transitory computer-readable storage medium includes instructions that when executed by a processor, cause the processor to, receive vehicle convoy data about an environment surrounding a vehicle convoy. The vehicle convoy includes a following vehicle and a preceding vehicle positioned immediately ahead of the following vehicle. The processor detects an intention of a remote vehicle to execute a cut-in maneuver into a path of the vehicle convoy based on the vehicle convoy data. The processor control a vehicle system of the following vehicle to project a status indication to a ground surface between the following vehicle and the preceding vehicle based on the intention of the remote vehicle. Further, the processor determines whether the cut-in maneuver is acceptable based on the intention of the remote vehicle and a distance between the following vehicle and the preceding vehicle. The processor generates a control signal to control one or more vehicles of the vehicle convoy based on whether the cut-in maneuver is acceptable, and executes the control signal at the one or more vehicles.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1A:
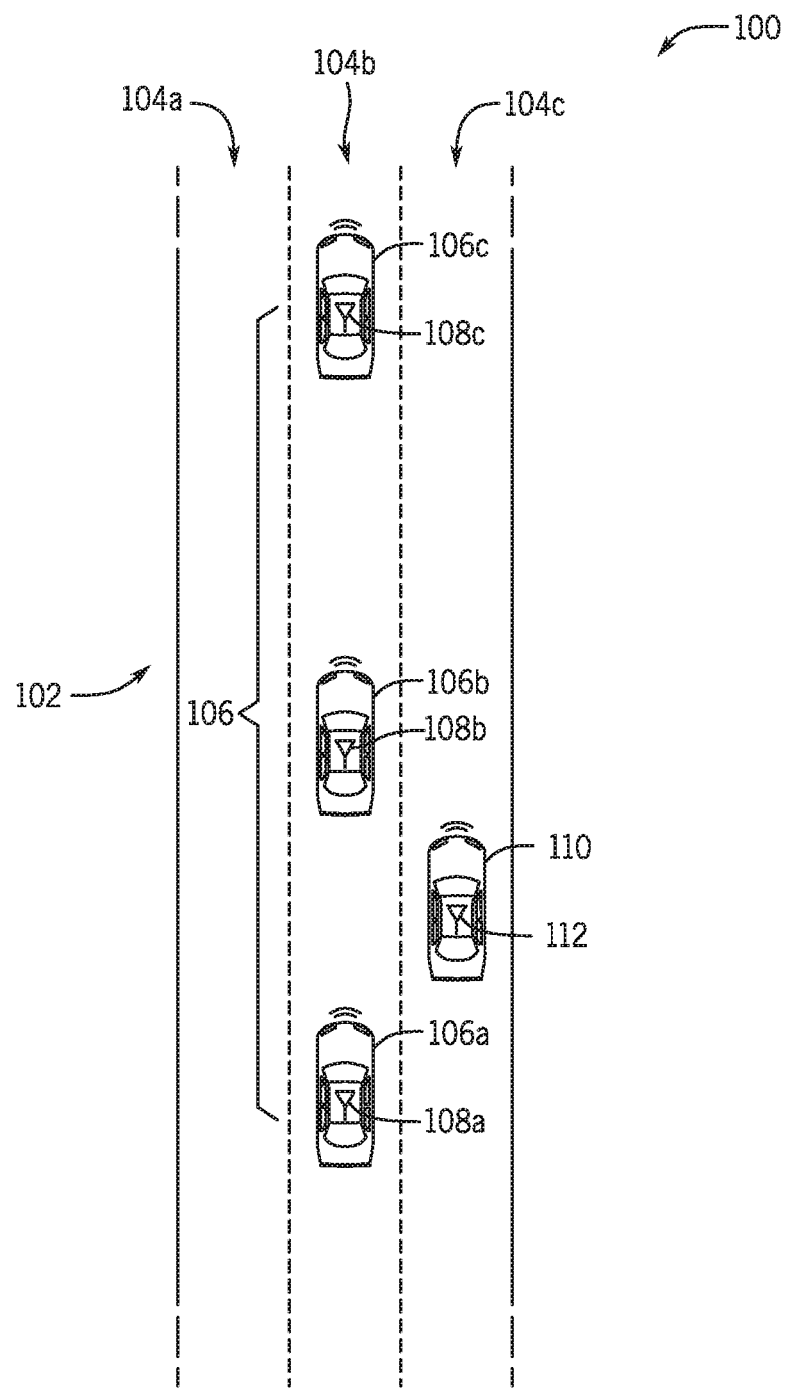
FIG. 1A is a schematic view of an exemplary traffic scenario according to one embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

"Vehicle control system" and/or "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Overview

The systems and methods discussed herein are generally directed to controlling vehicle systems of one or more vehicles and/or a vehicle convoy, to communicate (e.g., project a status indication) information about coordinated control of the one or more vehicles and/or the vehicle convoy. In particular, the information is communicated to inform surrounding vehicles about the coordinated control of the one or more vehicles and/or to discourage surrounding vehicles from performing maneuvers that would disrupt coordinated control of the one or more vehicles and/or the control of the vehicle convoy. Referring now to the drawings, wherein the showings are for purposes of illustrating one or more exemplary embodiments and not for purposes of limiting the same, FIG. 1A illustrates an exemplary traffic scenario 100 that will be used to describe some of the systems and methods herein. The traffic scenario 100 involves one or more vehicles on a roadway 102. The roadway 102 has a first lane 104a, a second lane 104b, and a third lane 104c. It is understood that the roadway 102 can have various configurations not shown in FIG. 1A, and can have any number of lanes.

In FIG. 1A, the traffic scenario 100 includes a following vehicle 106a (e.g., a host vehicle), a preceding vehicle 106b, and a leading vehicle 106c. The preceding vehicle 106b is positioned immediately ahead of the following vehicle 106a. The leading vehicle 106c is positioned immediately ahead of the preceding vehicle 106b. In the embodiments discussed herein, the following vehicle 106a, the preceding vehicle 106b, and the leading vehicle 106c are members of a vehicle convoy (e.g., a vehicle platoon), which will be generally referred to as convoy vehicles of a vehicle convoy 106. Control of each of the convoy vehicles in the vehicle convoy 106 is coordinated so that each of the convoy vehicles follow each other according to a navigational route. For example, the leading vehicle 106c is at the front of the vehicle convoy 106, and the trailing convoy vehicles (i.e., the preceding vehicle 106b, the following vehicle 106a) follow one behind the other, with the trailing convoy vehicles receiving guidance from the convoy vehicle ahead of it in order to determine its course.

Although the vehicle convoy 106 in FIG. 1A includes three convoy vehicles, it is understood that the vehicle convoy 106 can include at least two convoy vehicles and can include more than three convoy vehicles. It is also understood that the systems and method discussed herein can be applied to vehicles that are not part of a vehicle convoy, but instead, are paired together for coordinated control. For example, the following vehicle 106a and the preceding vehicle 106b may not be part of the vehicle convoy 106. In this example, the following vehicle 106a can be controlled by an adaptive cruise control (ACC) system that automatically adjusts the vehicle speed of the following vehicle 106a with respect to the preceding vehicle 106b to, for example, maintain a safe distance from the preceding vehicle 106b. Accordingly, the systems and methods discussed herein can be applied to coordinate control of vehicles even if these vehicles are not part of a vehicle convoy.

Referring again to FIG. 1A, the traffic scenario 100 also includes one or more remote vehicles surrounding (e.g., in proximity, within a predetermined distance) the vehicle convoy 106. In FIG. 1A, a remote vehicle 110 is shown travelling in the lane 104c, which is adjacent to the vehicle convoy 106. The remote vehicle 110 is not a member of the vehicle convoy 106. In FIG. 1A, the remote vehicle 110 has an intent to merge into the lane 104b, which would result in a cut-in maneuver into a path of the vehicle convoy 106. For example, a cut-in maneuver between the following vehicle 106a and the preceding vehicle 106b. This cut-in maneuver can potentially disrupt the coordinated control of the entire vehicle convoy 106 as a whole (e.g., flow, route), control of each convoy vehicle convoy 106, and in particular, control of the following vehicle 106a, which is following the preceding vehicle 106b. Accordingly, in the systems and methods discussed herein, one or more convoy vehicles within the vehicle convoy 106 can be controlled, in part, based on an environment surrounding the vehicle convoy, for example, based on data about the remote vehicle 110 (e.g., an intent to execute a cut-in maneuver).

The data about the remote vehicle 110 can be sensed by the convoy vehicles within the vehicle convoy 106 and/or communicated to the convoy vehicles within the vehicle convoy 106. For example, in FIG. 1A, each of the vehicles on the roadway 102 can sense proximate vehicles and objects, which is illustrated by the accurate lines emanating from the vehicles. Thus, the convoy vehicles in the vehicle convoy 106 can sense proximate vehicles and objects using one or more sensors. For example, the following vehicle 106*a* can include one or more sensors (e.g., cameras, RADAR), which are discussed in further detail herein, for sensing data about other vehicles and objects in proximity to the following vehicle 106*a* and/or the vehicle convoy 106.

In some embodiments, data about the remote vehicle 110 can be communicated to the vehicle convoy 106. Thus, in some embodiments, the following vehicle 106*a*, the preceding vehicle 106*b*, the leading vehicle 106*c*, and the remote vehicle 110 can communicate as part of a vehicle communication network, which will be discussed in more detail with FIG. 2. For simplicity, in FIG. 1A, the convoy vehicles in the vehicle convoy 106 and/or the remote vehicle 110 can transmit, receive, and/or exchange communications including data, messages, images, and/or other information with other vehicles, user, or infrastructures, using respective transceivers. In particular, the following vehicle 106*a* is equipped with a vehicle-to-vehicle (V2V) transceiver 108*a*, the preceding vehicle 106*b* is equipped with a V2V transceiver 108*b*, the leading vehicle 106*c* is equipped with a V2V transceiver 108*c*, and the remote vehicle 110 is equipped with a V2V transceiver 112. Using respective transceivers, the convoy vehicles, the vehicle convoy 106 and/or the remote vehicle 110 can exchange messages and information with other vehicles, users, or infrastructures that are operable for computer communication. It is understood that in some embodiments, one or more of the convoy vehicles in the vehicle convoy 106 and/or the remote vehicle 110 may not be operable for computer communication with one another (e.g., may not be equipped with V2V transceivers).

As mentioned above, one or more convoy vehicles within the vehicle convoy 106 can be controlled, in part, based the remote vehicle 110. In particular, the vehicle convoy 106 can communicate information about coordinated control of the vehicle convoy 106 and/or a status of the vehicle convoy 106 that is perceivable to other entities in proximity to the vehicle convoy 106, for example, the remote vehicle 110. In one embodiment, one or more of the convoy vehicles in the vehicle convoy 106 can project a visual indication on a ground surface of the road 102 that provides information about coordinated control of the vehicle convoy 106 and/or a status of the vehicle convoy 106.

Figure 1B:
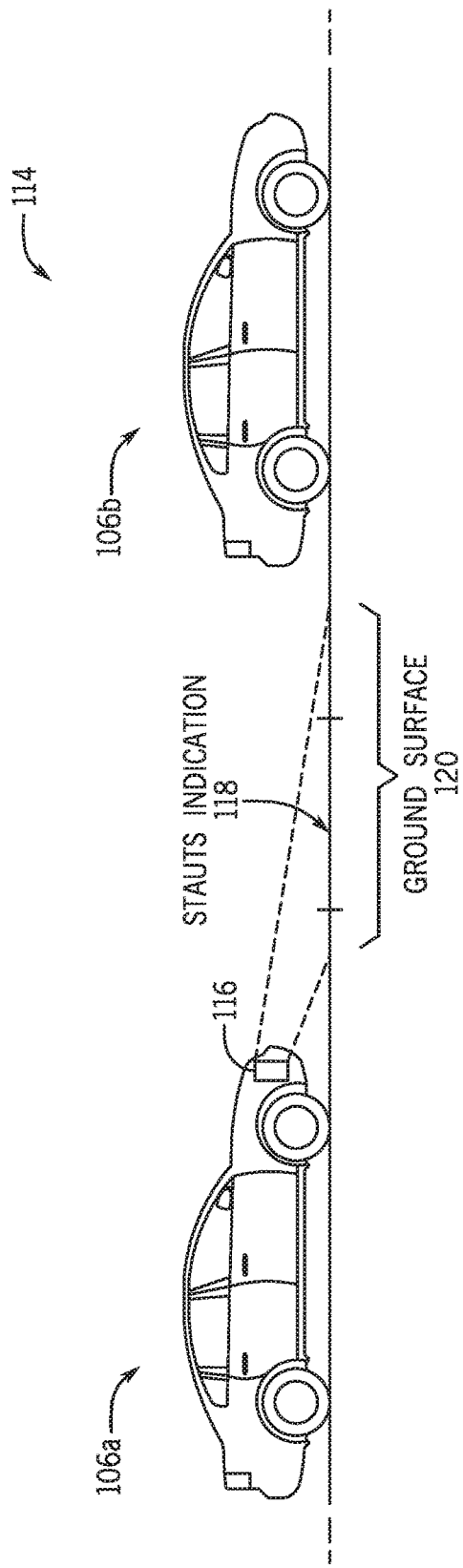
FIG. 1B is a schematic view of the following vehicle and the preceding vehicle shown in FIG. 1A according to an exemplary embodiment.

Referring now to FIG. 1B, a schematic view of the following vehicle 106*a* and the preceding vehicle 106*b* is shown illustrating projection of a visual indication that provides information about coordinated control of the vehicle convoy 106 and/or a status of the vehicle convoy 106. In FIG. 1B, the following vehicle 106*a* includes a vehicle system, namely, a projection system 116 that can emit visible light beams (e.g., lines, images, graphics). The projection system 116 can be, for example, a single light emitting diode (LED), an array of LEDs, or any other type of optical device. As shown in FIG. 1B, the projection system 116 can project a status indication 118 on a ground surface 120 of the road 102, where the ground surface 120 is an area between the following vehicle 106*a* and the preceding vehicle 106*b*. As will be described herein, the projection system 116 can be controlled to project the status indication 118 to the ground surface 120 based on the remote vehicle 110. The status indication 118 is observable by the remote vehicle 110 and/or other non-convoy entities in proximity to the vehicle convoy 106. As will be discussed herein, an some embodiments, the status indication 118 is provided to notify the remote vehicle 110 about the coordinated control of the vehicle convoy 106 and whether a predicted cut-in maneuver is permissible.

II. Vehicle Communication Network

Figure 2:
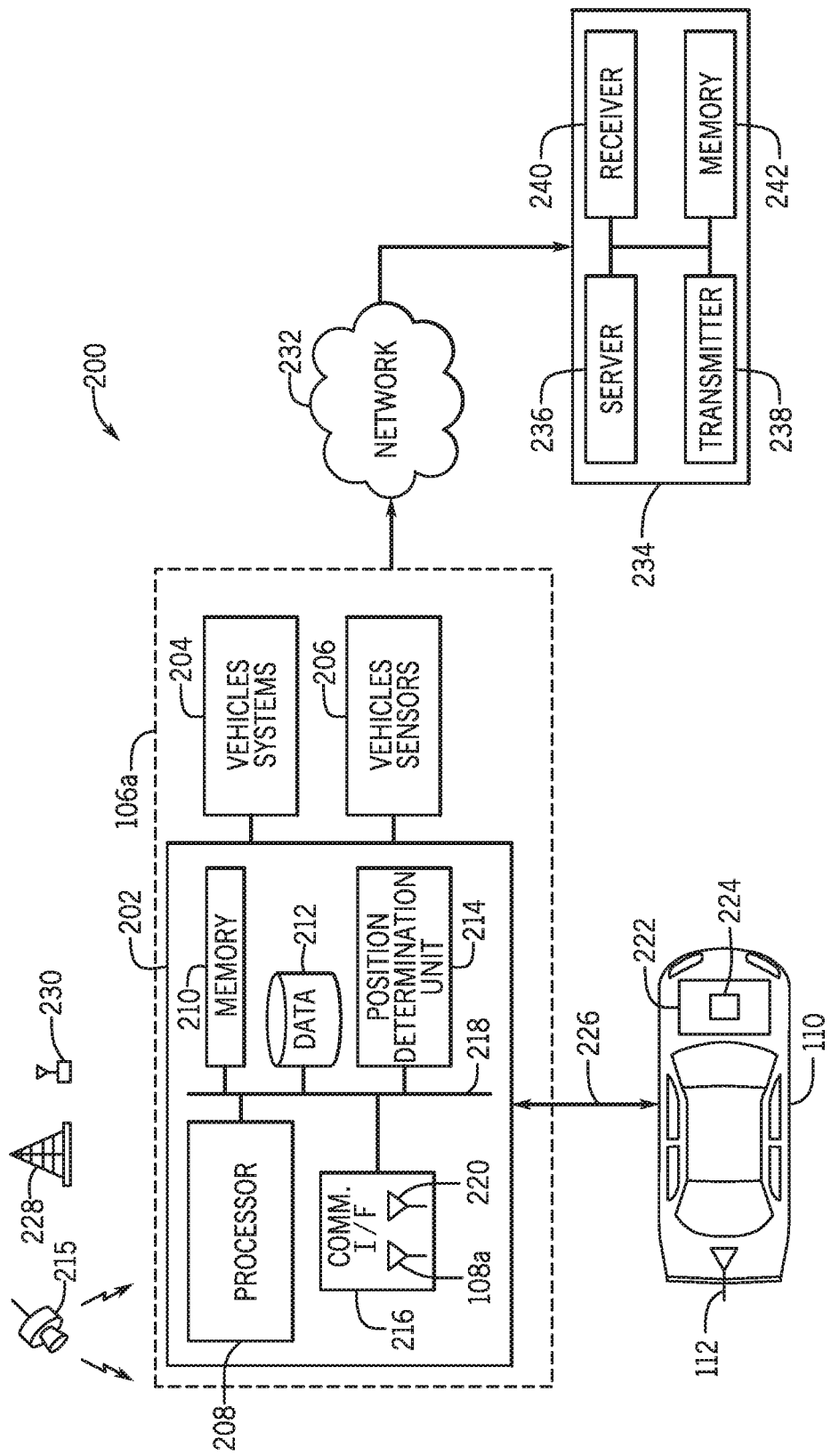
FIG. 2 is a schematic view of a vehicle communication network according to an exemplary embodiment.

Referring now to FIG. 2, a schematic view of a vehicle communication network 200 according to an exemplary embodiment is shown. The vehicle communication network 200 can be implemented with the vehicles are architecture shown in FIGS. 1A and 1B. In FIG. 2, a block diagram of the following vehicle 106*a* is shown with a simplified block diagram of the remote vehicle 110. However, it is understood that the preceding vehicle 106*b*, the leading vehicle 106*c*, and/or the remote vehicle 110 can include one or more of the components and/or functions discussed herein with respect to the following vehicle 106*a*. Thus, it is understood that although not shown in FIG. 2, one or more of the components of the following vehicle 106*a*, can also be implemented with the preceding vehicle 106*b*, the leading vehicle 106*c*, the remote vehicle 110, entities, and/or devices (e.g., V2X devices) operable with the vehicle communication network 200. Further, the components of the following vehicle 106*a* and the vehicle communication network 200, as well as the components of other systems, hardware architectures, and software architectures discussed herein, can be combined, omitted, or organized into different architectures for various embodiments.

In FIG. 2, the following vehicle 106*a* includes a vehicle computing device (VCD) 202, vehicle systems 204, and vehicle sensors 206. Generally, the VCD 202 includes a processor 208, a memory 210, a data store 212, a position determination unit 214, and a communication interface (I/F) 216, which are each operably connected for computer communication via a bus 218 and/or other wired and wireless technologies. As discussed above, some of the components shown in FIG. 2 with respect to the following vehicle 106*a* are not shown with respect the remote vehicle 110. For simplicity, in FIG. 2, the remote vehicle 110 includes a VCD 222 and a processor 224, but it is understood the remote vehicle 110 can include the same components and functionality discussed in detail with the following vehicle 106*a*.

Referring again to the following vehicle 106*a*, the VCD 202, can include provisions for processing, communicating and interacting with various components of the following vehicle 106*a* and other components of the vehicle communication network 200, including the convoy vehicles of the vehicle convoy 106 and the remote vehicle 110. In one embodiment, the VCD 202 can be implemented with the following vehicle 106*a*, for example, as part of a telematics unit, a head unit, an infotainment unit, an electronic control unit, an on-board unit, or as part of a specific vehicle control system, among others. In other embodiments, the VCD 202 can be implemented remotely from the following vehicle 106*a*, for example, with a portable device (not shown), a remote device (not shown), a remote server (e.g., remote server 236), or a remote processor (not show), connected via the vehicle communication network 200.

The processor 208 can include logic circuitry with hardware, firmware, and software architecture frameworks for facilitating control of the following vehicle 106*a* and/or one or more other convoy vehicles of the vehicle convoy 106. Thus, in some embodiments, the processor 208 can store application frameworks, kernels, libraries, drivers, application program interfaces, among others, to execute and control hardware and functions discussed herein. In some embodiments, the memory 210 and/or the data store (e.g., disk) 212 can store similar components as the processor 208 for execution by the processor 208.

The position determination unit 214 can include hardware (e.g., sensors) and software to determine and/or acquire position data about the following vehicle 106a. For example, the position determination unit 214 can include a global positioning system (GPS) unit (not shown) and/or an inertial measurement unit (IMU) (not shown). Thus, the position determination unit 214 can provide a geoposition of the following vehicle 106a based on satellite data from, for example, a global position source 215, or from any Global Navigational Satellite infrastructure (GNSS), including GPS, Glonass (Russian) and/or Galileo (European). Further, the position determination unit 214 can provide dead-reckoning data or motion data from, for example, a gyroscope, accelerometer, magnetometers, among other sensors (not shown). In some embodiments, the position determination unit 214 can be a navigation system that provides navigation maps and navigation information to the following vehicle 106a.

The communication interface 216 can include software and hardware to facilitate data input and output between the components of the VCD 202 and other components of the vehicle communication network 200. Specifically, the communication interface 216 can include network interface controllers (not shown) and other hardware and software that manages and/or monitors connections and controls bi-directional data transfer between the communication interface 216 and other components of the vehicle communication network 200. More specifically, and as mentioned with FIG. 1A above, the VCD 202 can exchange vehicle data, including messages and sensor data (e.g., from the vehicle systems 204, the vehicle sensors 206), with other vehicles operable for computer communication. For example, in FIG. 2, the V2V transceiver 108a can exchange data with the remote vehicle 110 via the V2V transceiver 112 using a communication link 226.

In the embodiments described herein, the vehicle communication can be implemented using Dedicated Short Range Communications (DSRC). However, it is understood that the vehicle communication described herein can be implemented with any communication or network protocol, for example, ad hoc networks, wireless access within the vehicle, cellular networks, Wi-Fi networks (e.g., IEEE 802.11), Bluetooth, WAVE, CALM, among others. Further, the vehicle communication network 200 can be vehicle-to-vehicle (V2V) or a vehicle-to-everything (V2X). Although only two vehicles are shown in FIG. 2, it is understood that the following vehicle 106a can communicate with more than one vehicle, device and/or entity configured for communication (e.g., DSRC) with the vehicle communication network 200, for example the preceding vehicle 106b and the leading vehicle 106c. Thus, in some embodiments, communication links can be established between the following vehicle 106a and a plurality of other vehicles configured for communication using the vehicle communication network 200. Further, in some embodiments, the following vehicle 106a and the remote vehicle 110 can exchange data utilizing a wireless network antenna 228, roadside equipment (RSE) 230, and/or a communication network 232 (e.g., a wireless communication network) or other wireless network connections.

As will be discussed herein, various types of data can be communicated using the vehicle communication network 200. In some embodiments, data is communicated via DSRC by exchanging one or more basic safety messages (BSM). The BSM that is broadcast by a vehicle can contain a number of data elements that describe various aspects of the operation of the vehicle or provide information about the vehicle itself. For example, the type and/or specifications of the vehicle, navigation data, roadway hazard data, traffic location data, course heading data, course history data, projected course data, kinematic data, current vehicle position data, range or distance data, speed and acceleration data, location data, vehicle sensory data, vehicle subsystem data, and/or any other vehicle information between networked vehicles for use in vehicle driving.

In the embodiments discussed herein, data about each of the convoy vehicles, the vehicle convoy 106, and the remote vehicle 110 can be communicated to one another using DSRC and the vehicle communication network 200. For example, in some embodiments, the leading vehicle 106c can communicate a convoy status (e.g., inactive, active) and/or a navigational route/course of the vehicle convoy 106 to the following vehicle 106a, the preceding vehicle 106b, and/or the remote vehicle 110. In other embodiments, the preceding vehicle 106b and the leading vehicle 106c can communicate position, speed, acceleration, velocity, and braking data, among others, to the following vehicle 106a, and vice versa. The same or similar types of data can be communicated from the convoy vehicles to the remote vehicle 110, and vice versa. Additionally, in some embodiments discussed herein, the remote vehicle can transmit messages (e.g., a request to perform a cut-in maneuver) to the convoy vehicles and/or the convoy vehicles can transmit messages (e.g., indicating whether a cut-in maneuver is permissible) to the remote vehicle 110.

As mentioned above, in some embodiments, data transmission can be executed at and/or with other infrastructures and servers. For example, in FIG. 2, the VCD 202 can transmit and receive information directly or indirectly to and from a service provider 234 over the communication network 232. The service provider 234 can include a remote server 236, a remote transmitter 238, a remote receiver 240, and a remote memory 242 that are configured to be in communication with one another. Thus, in FIG. 2, the V2V transceiver 108a can be used by the VCD 202 to receive and transmit information to and from the service provider 234 and other servers, processors, and information providers through the communication network 232. In alternative embodiments, a radio frequency (RF) transceiver 220 in the following vehicle 106a can be used to receive and transmit information to and from the service provider 234. In some embodiments, the VCD 202 can receive and transmit information to and from the service provider 234 including, but not limited to, traffic data, vehicle location and heading data, high-traffic event schedules, weather data, or other transport related data. In some embodiments, the service provider 234 can be linked to multiple vehicles (e.g., the preceding vehicle 106b, the leading vehicle 106c, the remote vehicle 110), other entities and/or devices through a network connection, such as via the wireless network antenna 228, the road side equipment 230, and/or other network connections.

Referring again to the following vehicle 106a, the vehicle systems 204 can include any type of vehicle control system and/or vehicle described herein to enhance the following vehicle 106a and/or driving of the following vehicle 106a. For example, the vehicle systems 204 can include the projection system 116 (FIG. 1B) or an intelligent cruise control system, for example cooperative adaptive cruise control (C-ACC) systems or adaptive cruise control (ACC) systems. In other embodiments, the vehicle systems 204 can also include other types of advanced driving assistance systems (ADAS), for example, autonomous driving systems, driver-assist systems, lane departure warning systems, merge assist systems, freeway merging, exiting, and lane-change systems, collision warning systems, integrated vehicle-based safety systems, and automatic guided vehicle systems. One or more of the vehicle systems 204, including the projection system 116 and an ACC system, can be controlled according the systems and methods discussed herein.

Further, the vehicle sensors 206, which can be implemented with the vehicle systems 204, can include various types of sensors for use with the following vehicle 106*a* and/or the vehicle systems 204 for detecting and/or sensing a parameter of the following vehicle 106*a*, the vehicle systems 204, the environment surrounding the following vehicle 106*a*, and/or the vehicle convoy 106. For example, the vehicle sensors 206 can provide data about vehicles in proximity to the following vehicle 106*a*, for example, the convoy vehicles and the remote vehicle 110. More specifically, the vehicle sensors 206 can measure speed and/or position data about the preceding vehicle 106*b*, the leading vehicle 106*c*, and/or the remote vehicle 110.

In one embodiment, the vehicle sensors 206 can include visions sensors (e.g., imaging devices, cameras) and/or ranging sensors (e.g., RADAR, LIDAR). It is understood that the vehicle sensors 206 can be disposed in one or more portions of the following vehicle 106*a*. For example, although not shown in FIG. 2, the vehicle sensors 206 could be integrated into a dashboard, seat, seat belt, door, bumper, front, rear, corners, dashboard, steering wheel, center console, roof or any other portion of the following vehicle 106*a*. In other cases, however, the vehicle sensors 206 could be portable sensors worn by a driver (not shown), integrated into a portable device (not shown), carried by the driver (not shown), integrated into an article of clothing (not shown) worn by the driver, or integrated into the body of the driver (e.g. an implant) (not shown).

As mentioned above, the vehicle sensors 206 can include ranging sensors. For example, a front long range RADAR and/or a front mid-range RADAR. The front long range RADAR can measure distance (e.g., lateral, longitudinal) and speed of objects surrounding the following vehicle 106*a*. For example, the first long range RADAR can measure distance and speed of other vehicles (e.g., the remote vehicle 110) and/or other objects and entities surrounding the following vehicle 106*a* and/or the vehicle convoy 106. In other embodiments, the vehicle sensors 206 can include a plurality of RADARs in different location of the following vehicle 106*a*.

Using the system and network configuration discussed above, the convoy vehicles of the vehicle convoy 106 can detect an intent of the remote vehicle 110 to merge into a path of the vehicle convoy 106 and/or execute a cut-in maneuver into a path of the vehicle convoy 106 (i.e., between two convoy vehicles of the vehicle convoy 106). The vehicle convoy 106 can be controlled to provide an indication (i.e., project a status indication) to the remote vehicle 110 about the coordinated control and/or status of the vehicle convoy 106. Further, the vehicle convoy 106 can determine whether the cut-in maneuver is permissible and communicate information about the cut-in maneuver to the remote vehicle 110 via the indication and/or the vehicle communication network 200. Detailed embodiments describing exemplary methods using the system and network configuration discussed above will now be discussed in detail.

III. Methods for Controlling Vehicles in a Vehicle Convoy

Figure 3:
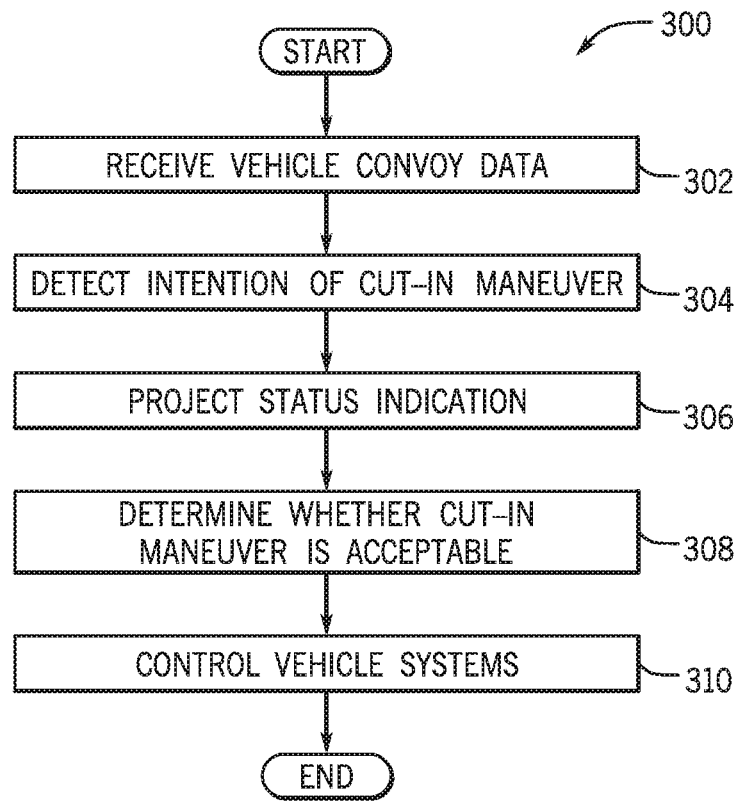
FIG. 3 is a process flow diagram of a method for controlling vehicles in a vehicle convoy according to an exemplary embodiment.

Referring now to FIG. 3 a process flow diagram of a method 300 for controlling vehicles in a vehicle convoy according to an exemplary embodiment is shown. The method 300 will be discussed with reference to FIGS. 1A, 1B, and 2. Further, it is understood that the blocks of the method 300 can be combined, omitted, or organized into different architectures for various embodiments.

At block 302, the method 300 includes receiving vehicle convoy data, for example, vehicle convoy data about an environment surrounding the vehicle convoy 106. Vehicle convoy data can include vehicle data, parameters, and/or status about the entire vehicle convoy 106, each of the convoy vehicles, and/or the remote vehicle 110. Vehicle convoy data about the vehicle convoy 106 can include a status of the vehicle convoy 106 (e.g., active, inactive), a number of vehicles in the vehicle convoy 106, a navigation course of the vehicle convoy 106, among others. Vehicle convoy data about each of the convoy vehicles (i.e., the following vehicle 106*a*, the preceding vehicle 106*b*, the leading vehicle 106*c*) can include, for example, a speed, a distance, a position, an inter-vehicle distance between the convoy vehicles and another convoy vehicles, a parameter of an ACC system controlling the convoy vehicles, and/or other data bout the convoy vehicles or a vehicle system of the convoy vehicles. Likewise, vehicle convoy data about the remote vehicle 110 can include for example, a speed, a distance, a position, and/or other data bout the remote vehicle 110 or a vehicle system of the remote vehicle 110. In some embodiments, the vehicle convoy data about the remote vehicle 110 can include a message or a request to perform a cut-in maneuver.

In one embodiment, the processor 208 can receive vehicle convoy data from the vehicle systems 204 and/or the vehicle sensors 206. As discussed above, the vehicle systems 204 and/or the vehicle sensors 206 can measure data about an environment surrounding the following vehicle 106*a*, including data about the remote vehicle 110 and/or the convoy vehicles. For example, as discussed above, the vehicle sensors 206 can include ranging sensors which can measure a speed, a distance, a position, among other types of data, about the remote vehicle 110 and/or the convoy vehicles.

In other embodiments, the vehicle convoy data can be communicated using the vehicle communication network 200. For example, as discussed above a speed, a distance, a position and/or other vehicle data about the remote vehicle 110 can be transmitted from the remote vehicle 110 (e.g., via the V2V transceiver 112) to the following vehicle 106*a* (e.g., via the V2V transceiver 108*a*). In some embodiments, the remote vehicle 110 can transmit a message to the following vehicle 106*a* and/or the vehicle convoy 106 including an intent or a request to perform a merge maneuver (e.g., a cut-in maneuver) into a path of the following vehicle 106*a* and/or a path of the vehicle convoy 106. The following vehicle 106*a* can also transmit a message to the remote vehicle including a notification about whether the merge maneuver is permissible.

It is understood that in some embodiments, the vehicle convoy data received at block 302 can include data about the following vehicle 106*a* itself, for example, from the onboard vehicle systems 204 and/or the vehicle sensors 206. In some embodiments this data can include parameters used by the ACC system (e.g., the vehicle systems 204) to control the following vehicle 106*a* in relation to one or more convoy vehicles, namely, the preceding vehicle 106*b* according to the navigation course of the vehicle convoy 106. As discussed above, the ACC can control the following vehicle 106*a* by providing automatic braking and/or acceleration for speed control and to maintain a headway with respect to the preceding vehicle 106*b*. Thus, the data provided by the ACC system can include a headway reference time, a headway reference distance, an ACC control speed, an inter-vehicle distance, among others, used to control motion of the following vehicle 106a relative to the preceding vehicle 106b and/or the vehicle convoy 106.

At block 304, the method 300 includes detecting an intention of the remote vehicle 110 to execute a cut-in maneuver into a path of the following vehicle 106a based on the vehicle convoy data. For example, in one embodiment, the processor 208 can determine based on the position of the remote vehicle 110, the position of the following vehicle 106a, and the position of the preceding vehicle 106b, that the remote vehicle 110 intends to execute a cut-in maneuver into a path between the following vehicle 106a and the preceding vehicle 106b. In another embodiment, the intention of the remote vehicle 110 to execute a cut-in maneuver can be based on detecting a turn-signal indicator of the remote vehicle 110 (e.g., using imaging sensors). In a further embodiment, the intention of the remote vehicle 110 to execute a cut-in maneuver can be based on receiving an intent to merge message from the remote vehicle 110.

At block 306, the method 300 includes projecting a status indication. More specifically, the processor 208 controls a vehicle system (e.g., the projection system 116) of the following vehicle 106a to project a status indication 118 to a ground surface 120 between the following vehicle 106a and the preceding vehicle 106b based on the intention of the remote vehicle 110. Thus, the processor 208 can generate a control signal executed by the projection system 116 causing the projection system 116 to emit visible light (e.g., lines, images, graphics) to the ground surface 120 between the following vehicle 160a and the preceding vehicle 160b. This status indication 118 is observable by the remote vehicle 110 and provides an indication to the remote vehicle 110 that the following vehicle 106a and the preceding vehicle 106b are part of the vehicle convoy 106. The status indication 118 also provides an indication of coordinated control between the following vehicle 106a and the preceding vehicle 106b. Thus, the status indication 118 can provide a warning and/or notification to the remote vehicle 110 discourage the cut-in maneuver by the remote vehicle 110.

It is understood that characteristics of the status indication 118, for example, color, intensity, design, flashing pattern can be varied according to the vehicle convoy data and/or the intent the remote vehicle 110 to execute a cut-in maneuver. For example, the color of the status indication 118 can be provided in a steady state light with a red color to readily gain the attention of a driver (not shown) of the remote vehicle 110. This status indication can notify the driver of the remote vehicle 110 that the following vehicle 106a and the preceding vehicle 106b are part of the vehicle convoy 106, the cut-in maneuver could disrupt the vehicle convoy 106, and/or present a collision risk. It is also understood that in addition to the status indication 118, other types of alerts or notifications can be provided that may be perceived by the remote vehicle 110. For example, audible noise (e.g., honking) can also be provided.

In some embodiments, block 306 can also include transmitting a message using the vehicle communication network 200 to the remote vehicle 110 indicating a status of the vehicle convoy 106. The status of the vehicle convoy 106 can be determined based on the vehicle convoy data as discussed above with block 302. Thus, in addition to providing the status indication 118, the processor 208 can transmit a message via the V2V transceiver 108a using the communication network 200 for receipt by the V2V transceiver 112 of the remote vehicle 110.

Referring again to the method 300, block 308 includes determining whether the cut-in maneuver is acceptable. More specifically, the processor 208 determines whether the cut-in maneuver is acceptable based on the intention of the remote vehicle 110, a distance between the following vehicle 106a and the preceding vehicle 106b, and/or the vehicle convoy data. For example, as mentioned above, the vehicle sensors 206 can include RADAR sensors which can measure a distance between the following vehicle 106a and the preceding vehicle 106b. Further, as discussed above, the vehicle systems 204 can include an ACC system, which can provide parameters about the ACC system. For example, a headway reference time, a headway reference distance, inter-vehicle distance, an ACC control speed, among others, used to control motion of the following vehicle 106a relative to the preceding vehicle 106b. Thus, the processor 208 can use a speed, a position and/or other vehicle data about the remote vehicle 110, and a speed, a distance, a position and/or other vehicle data about the following vehicle 106a, the preceding vehicle 106b, and/or the leading vehicle 106c to determine whether there is sufficient space and/or time to execute the cut-in maneuver (i.e., whether the cut-in maneuver is permissible).

In some embodiments, the processor 208 can determine whether inter-vehicle spacing (e.g., an inter-vehicle distance between each convoy vehicle in the vehicle convoy 106) within the vehicle convoy 106 and/or the speeds of the convoy vehicles within the vehicle convoy 106 can be adjusted to allow for execution of the cut-in maneuver by the remote vehicle 110. Said differently, motion of one or more of the convoy vehicles in the vehicle convoy 106 can be controlled to provide sufficient spacing and time to allow the cut-in maneuver. For example, the processor 208 can analyze a speed, a distance, a position and/or other vehicle data about each convoy vehicle in the vehicle convoy 106 to determine whether control of the convoy vehicles (e.g., control of the ACC system of the convoy vehicles) can be modified to allow the cut-in maneuver. As will be discussed below, if motion of one or more of the convoy vehicles in the vehicle convoy 106 can be modified to allow the cut-in maneuver, the processor 208 and/or the ACC system can generate control signals (e.g., acceleration/braking control signals) to be executed by one or more of the convoy vehicles in the vehicle convoy 106.

In some embodiments, block 308 can include determining whether the cut-in maneuver is acceptable is based on a status of the vehicle convoy 106. A vehicle convoy status can be determined based on the vehicle convoy data as discussed above. If the vehicle convoy status is determined to be inactive, the processor 208 can determine that the cut-in maneuver is allowable. In one embodiment, which will be discussed with FIG. 4 below, if the convoy status is determined to be inactive, the processor 208 can control the vehicle system (e.g., the projection system 116) to terminate projection of the status indication 118.

At block 310, the method 300 includes controlling one or more of the convoy vehicles, for example, the following vehicle 106a, based on whether the cut-in maneuver is acceptable. For example, in one embodiment, the processor 208 can transmit a message using the vehicle communication network 200 to the remote vehicle 110 indicating whether the cut-in maneuver is acceptable. More specifically, the processor 208 transmits a message using the wireless transceiver 108a and the vehicle communication network 200 to the remote vehicle 110 indicating whether the cut-in maneuver is acceptable. In one embodiment, controlling the following vehicle 106a based on whether the cut-in maneuver is acceptable includes the processor 208 modifying the status indication 118 projected by the vehicle system (e.g., the projection system 116). This embodiment, including blocks 308 and 310, will now be described in detail with respect to FIG. 4.

Figure 4:
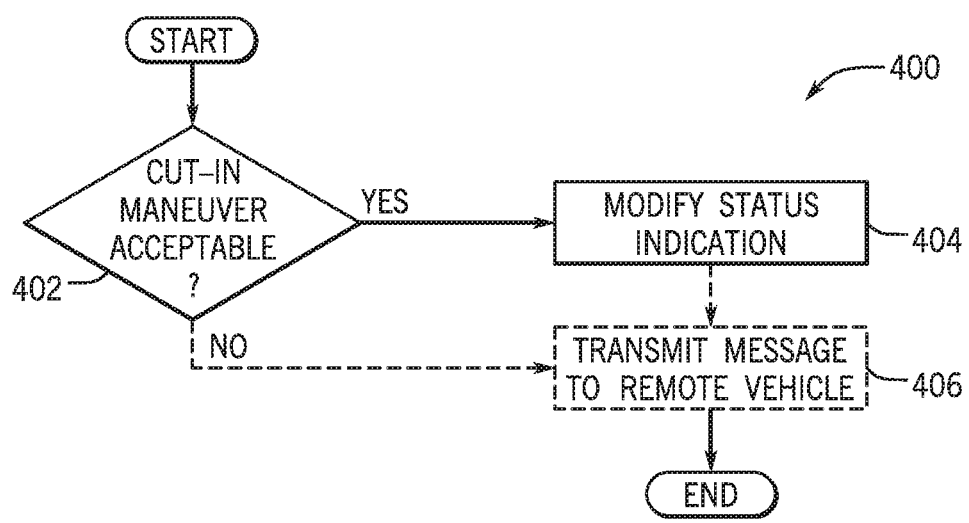
FIG. 4 is a process flow diagram of a method for modifying a status indication according to an exemplary embodiment.

Referring now to FIG. 4, a process flow diagram of a method 400 for controlling vehicles in a vehicle convoy according to an exemplary embodiment is shown. The method 400 will be discussed with reference to FIGS. 1A, 1B, and 2. Further, it is understood that the blocks of the method 400 can be combined, omitted, or organized into different architectures for various embodiments. At block 402, the method 400 includes determining whether the cut-in maneuver is acceptable as discussed above with block 308. If the cut-in maneuver is acceptable, (YES), at block 404, the method 400 includes modifying the status indication 118 projected by the vehicle system (e.g., the projection system 116).

More specifically, upon determining the cut-in maneuver is acceptable, modifying the status indication 118 projected by the projection system 116 includes the processor 208 controlling the projection system 116 to terminate projection of the status indication 118. Thus, the processor 208 can modify the status indication 118 by generating a control signal that is executed by the projection system 116 to terminate projection of the status indication 118. Terminating projection of the status indication 118 notifies the remote vehicle 110 that the cut-in maneuver is permissible. In some embodiments, if the cut-in maneuver is acceptable, the processor 208 can also disable the ACC control (e.g., by modifying and/or disabling a parameter of the ACC system) between the following vehicle 106a and the preceding vehicle 106b to allow the remote vehicle 110 to execute the cut-in maneuver. Further, in some embodiments, at block 406, the method 400 can optionally include the processor 208 transmitting a message using the vehicle communication network 200 to the remote vehicle 110 indicating the cut-in maneuver is acceptable.

Referring again to block 402, if the cut-in maneuver is not acceptable, (NO), at block 408, the method 400 includes maintaining the status indication 118 (e.g., not modified, not terminated). This provides an indication to the remote vehicle 110 that the cut-in maneuver is not acceptable and that coordinated control between the following vehicle 106a and the preceding vehicle 106b is still active. However, it is understood that in some embodiments, upon determining the cut-in maneuver is not acceptable, a characteristic of the status indication 118 could be modified to gain the attention of the driver of the remote vehicle 110 thereby providing an indication that the cut-in maneuver is not acceptable. For example, the status indication 118 can be modified from a steady red light to a blinking red light. Further, in some embodiments, at block 406, the method 400 can optionally include, upon determining the cut-in maneuver is not acceptable, the processor 208 transmitting a message using the vehicle communication network 200 to the remote vehicle 110 indicating the cut-in maneuver is not acceptable.

Referring back to block 310 of FIG. 3, in some embodiments, block 310 can include controlling vehicles in the vehicle convoy 106 based on whether the cut-in maneuver is acceptable. As discussed above with block 308, in some embodiments, motion of one or more of the convoy vehicles in the vehicle convoy 106 can be modified to allow the cut-in maneuver. For example, a parameter of the ACC system can be modified to allow the cut-in maneuver. In this embodiment, the processor 208 and/or the ACC system can generate a control signal to control one or more vehicles of the vehicle convoy 106 based on whether the cut-in maneuver is acceptable. Thus, in one embodiment, the processor 208 and/or the ACC system can control the following vehicle 106a based on whether the cut-in maneuver is acceptable, by changing the distance (e.g., time headway distance, inter-vehicle distance) between the following vehicle 106a and the preceding vehicle 106b. In other embodiments, the distance between the preceding vehicle 106b and the leading vehicle 106c can be modified. For example, the processor 208 can generate a control signal and transmit the control signal to the preceding vehicle 106b, where the processor and/or the ACC system of the preceding vehicle 106b controls motion of the preceding vehicle 106b relative to the leading vehicle 106c according to the control signal.

Modifying a distance and/or a parameter of an ACC system to allow the cut-in maneuver can be performed in addition to modifying the status indication 118 as discussed above. For example, modifying the status indication 118 projected by the vehicle system (e.g., the projection system 116) upon determining the cut-in maneuver is acceptable (e.g., at block 404 of method 400) can be performed during or after motion control of the one or more of the convoy vehicles in the vehicle convoy 106. Accordingly, by providing active notifications about the coordinate control and the status of the vehicle convoy 106, surrounding vehicles (e.g., the remote vehicle 110) can be made aware of the coordinate control and discourage the surrounding vehicles from performing maneuvers that would disrupt the vehicle convoy 106.

The embodiments discussed herein can also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media excludes non-transitory tangible media and propagated data signals.

It will be appreciated that various implementations of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed herein.

The invention claimed is:

1. A computer-implemented method for controlling vehicles in a vehicle convoy, the vehicles in the vehicle convoy including a following vehicle and a preceding vehicle positioned immediately ahead of the following vehicle, comprising:

receiving vehicle convoy data about an environment surrounding the vehicle convoy;

detecting an intention of a remote vehicle to execute a cut-in maneuver into a path of the following vehicle based on the vehicle convoy data;

controlling a vehicle system of the following vehicle to project a status indication to a ground surface between the following vehicle and the preceding vehicle based on the intention of the remote vehicle;

determining whether the cut-in maneuver is acceptable based on the intention of the remote vehicle and a distance between the following vehicle and the preceding vehicle; and controlling the following vehicle to modify a first characteristic of the status indication projected by the vehicle system upon determining that the cut-in maneuver is acceptable and modify a second characteristic of the status indication projected by the vehicle system upon determining that the cut-in maneuver is unacceptable.

2. The computer-implemented method of claim 1, wherein the status indication is observable by the remote vehicle.

3. The computer-implemented method of claim 1, further including transmitting a message using a vehicle communication network to the remote vehicle indicating whether the cut-in maneuver is acceptable.

4. The computer-implemented method of claim 1, wherein upon determining the cut-in maneuver is acceptable, modifying the first characteristic of the status indication projected by the vehicle system includes controlling the vehicle system to terminate projection of the status indication.

5. The computer-implemented method of claim 1, wherein upon determining the cut-in maneuver is not acceptable, transmitting a message using a vehicle communication network to the remote vehicle indicating the cut-in maneuver is not acceptable.

6. The computer-implemented method of claim 1, wherein controlling the following vehicle based on whether the cut-in maneuver is acceptable includes changing the distance between the following vehicle and the preceding vehicle.

7. The computer-implemented method of claim 1, wherein controlling the vehicle system of the following vehicle to project the status indication to the ground surface between the following vehicle and the preceding vehicle based on the intention of the remote vehicle includes transmitting a message using a vehicle communication network to the remote vehicle indicating a status of the vehicle convoy.

8. The computer-implemented method of claim 1, including determining a status of the vehicle convoy.

9. The computer-implemented method of claim 8, wherein upon determining the status of the vehicle convoy is inactive, controlling the following vehicle based on whether the cut-in maneuver is acceptable includes controlling the vehicle system to terminate projection of the status indication.

10. A system for controlling vehicles in a vehicle convoy, the vehicle convoy including a following vehicle and a preceding vehicle, wherein the preceding vehicle is position immediately ahead of the following vehicle, comprising:

a sensor system to measure vehicle convoy data about an environment surrounding the following vehicle and the preceding vehicle; and a processor operatively connected for computer communication to the sensor system, wherein the processor:

detects an intention of a remote vehicle in the environment surrounding the following vehicle and the preceding vehicle to execute a cut-in maneuver into a path of the following vehicle based on the vehicle convoy data;

controls a vehicle system of the following vehicle to project a status indication to a ground surface between the following vehicle and the preceding vehicle based on the intention of the remote vehicle;

determines whether the cut-in maneuver is acceptable based on the intention of the remote vehicle and a distance between the following vehicle and the preceding vehicle; and controls a vehicle system of the following vehicle to modify a first characteristic of the status indication projected by the vehicle system upon determining that the cut-in maneuver is acceptable and modify a second characteristic of the status indication projected by the vehicle system upon determining that the cut-in maneuver is unacceptable.

11. The system of claim 10, including a wireless transceiver for communicating with the remote vehicle via one or more communication links using a vehicle communication network.

12. The system of claim 11, wherein the processor transmits a message using the wireless transceiver and the vehicle communication network to the remote vehicle indicating whether the cut-in maneuver is acceptable.

13. The system of claim 10, wherein upon determining the cut-in maneuver is acceptable, the processor modifies the first characteristic of the status indication projected by the vehicle system by terminating projection of the status indication.

14. A non-transitory computer-readable storage medium including instructions that when executed by a processor, cause the processor to:

receive vehicle convoy data about an environment surrounding a vehicle convoy, the vehicle convoy including a following vehicle and a preceding vehicle positioned immediately ahead of the following vehicle;

detect an intention of a remote vehicle to execute a cut-in maneuver into a path of the vehicle convoy based on the vehicle convoy data;

control a vehicle system of the following vehicle to project a status indication to a ground surface between the following vehicle and the preceding vehicle based on the intention of the remote vehicle;

determine whether the cut-in maneuver is acceptable based on the intention of the remote vehicle and a distance between the following vehicle and the preceding vehicle;

generate a control signal to control to modify a first characteristic of the status indication upon determining that the cut-in maneuver is acceptable and modify a second characteristic of the status indication projected by the vehicle system upon determining that the cut-in maneuver is unacceptable; and execute the control signal at the following vehicle.

15. The non-transitory computer-readable storage medium of claim 14, wherein upon determining the cut-in maneuver is acceptable, the processor generates the control signal to modify the first characteristic of the status indication to terminate projection of the status indication.

16. The non-transitory computer-readable storage medium of claim 14, further including causing the processor to transmit a message using a vehicle communication network to the remote vehicle indicating whether the cut-in maneuver is acceptable.

17. The non-transitory computer-readable storage medium of claim 14, wherein the processor generates the control signal to change the distance between the following vehicle and the preceding vehicle based on whether the cut-in maneuver is acceptable.

* * * * *